July 20, 1943. D. H. FINKLE 2,324,687
FASTENER
Filed June 22, 1942
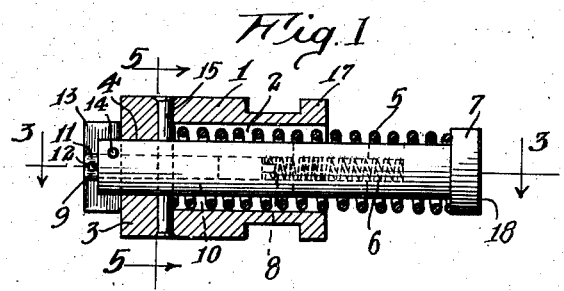
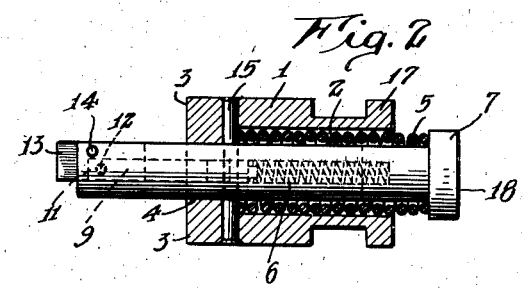
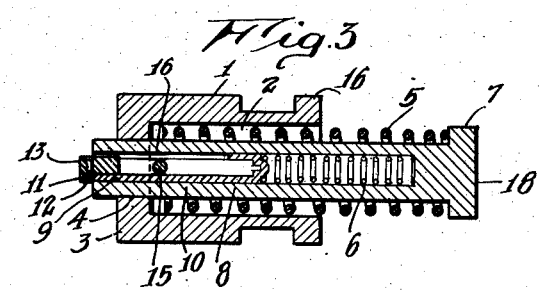
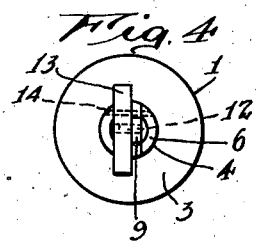 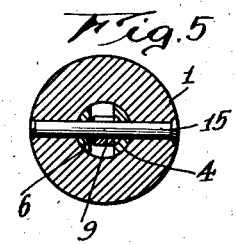
Inventor
Donald H. Finkle
By Lyon & Lyon
Attorneys Patented July 20, 1943

2,324,687

UNITED STATES PATENT OFFICE 2,324,687

FASTENER

Donald H. Finkle, Los Angeles, Calif.

Application June 22, 1942, Serial No. 447,937

6 Claims. (Cl. 85—3)

My invention relates to a fastener, and more particularly to a temporary fastener, for clamping together parts to be riveted and for aligning the rivet holes therein.

Fasteners for temporarily clamping and aligning rivet holes are well known in the aircraft industry where the parts to be clamped are of light material. My present invention is directed to a similar clamp for holding the larger and heavier plates used in ship construction.

All present temporary fasteners rely on either a wedging operation or the tensile strength of the fastener to align the rivet holes. Because of the increased thickness of ship plates, the wedge type will not properly center or align the rivet holes and the other types of fasteners cannot be made of sufficiently heavy materials to support the weight.

It is, therefore, an object of my invention to produce a temporary fastener which can be used in the clamping and alignment of rivet holes of large and heavy plates.

Other objects and advantages of my invention will be apparent from the following drawing and description of the preferred embodiment of my invention.

In the drawing:

Fig. 1 is a cross section of my fastener.

Fig. 2 is a cross section with the fastener in expanded position for insertion in a rivet hole.

Fig. 3 is a cross section taken on the line 3—3 of Fig. 1.

Fig. 4 is an end view.

Fig. 5 is a cross section taken on the line 5—5 of Fig. 1.

Referring to the drawing, my fastener comprises a body 1 having a central bore 2, an end 3 and a substantially circular hole 4 through said end 3. A spring 5, for actuating and maintaining a clamping action, is placed in said bore 2 and a bifurcated pin 6, having a flange 7, is placed through said bore 2 and hole 4 so that the spring 5 engages the flange 7 and the end 3 of the bore 2.

Between the bifurcations of the pin 6 is positioned a spring 8, one end of which engages the base of the bifurcation and the other end the end 10 of a drag link 9. The other end 11 of the drag link 9 is pivotally connected at 12 to a pivotally mounted clamping member 13. The clamping member 13 is carried by the pivot 14 passing through and permanently fastened to the bifurcated pin 6.

A rod or bar 15 is passed through the body 1 and through a hook 16 on the drag link 9 to prevent motion between the drag link 9 and the body 1. The rod 15 could be placed through the hook 16 and bear against the end of the bore 2 with the spring 5 bearing against the rod 15 rather than the end of the bore 2 and accomplish the same result.

In the operation of my clamp, a compressing tool, such as a pair of pliers, is used to engage the flange 17 and the end 18 of the bifurcated pin 6 and to compress the spring 5 and thus urge the bifurcated pin out of the hole 4. Because the drag link 9 is pinned to the body 1, it cannot move in relation to the body but will move in relation to the bifurcated pin 6 and compress the spring 8 and thus cause a rotation of the clamping member 13 until the clamping member 13 is parallel with the bifurcated pin 6. In this position the fastener can be inserted in a rivet hole. Upon release of the pressure on the spring 5, the spring will force the bifurcated pin in the return direction and the spring 8 will act upon the drag link 9 to return the clamping member 13 to a perpendicular position in relation to the bifurcated pin 6. At the same time, the spring 5 will exert a compressing force between the end 3 of the body 1 and the clamping member 13, thus securely clamping any plates positioned therebetween.

To properly align the rivet holes in the plates while the same are clamped between the end 3 and the clamping member 13, the bifurcated pin 6 is substantially the same diameter as the rivet holes to be aligned.

While I have described the preferred embodiment of my invention, I am not limited to any of the details of construction except as specifically stated in the appended claims.

I claim:

1. In a temporary fastener, a body, a pin passing through said body, a clamping member pivotally mounted at the end of said pin, link means connecting said body to said clamping member to pivot said clamping member when said body is moved in relation to said pin.

2. In a temporary fastener, a body, a pin passing through said body, a clamping member pivotally mounted at the end of said pin, link means connecting said body to said clamping member to pivot said clamping member when said body is moved in relation to said pin, and tension means to clamp materials between the end of said body and said clamping member.

3. In a temporary fastener for aligning rivet holes, a body, a pin passing through said body having a diameter substantially that of the rivet holes to be aligned, a clamping member pivotally mounted at the end of said pin, link means connecting said body and said clamping member to pivot said clamping member when said body is moved in relation to said pin.

4. In a temporary fastener for aligning rivet holes, a body, a pin passing through said body having a diameter substantially that of the rivet holes to be aligned, a clamping member pivotally mounted at the end of said pin, link means connecting said body and said clamping member to pivot said clamping member when said body is moved in relation to said pin, and tension means to clamp materials between the end of said body and said clamping member.

5. In a temporary fastener, a body, a pin passing through said body, a clamping member pivotally mounted at the end of said pin, link means connecting said body and said clamping member to pivot said clamping member when said body is moved in relation to said pin, and a spring means to return said clamping member to its original position when said body is returned to its original relation to said pin.

6. In a temporary fastener, a body, a pin passing through said body, a clamping member pivotally mounted at the end of said pin, link means connecting said body and said clamping member to pivot said clamping member when said body is moved in relation to said pin, a spring means to return said clamping member to its original position when said body is returned to its original relation to said pin, and tension means to clamp materials between the end of said body and said clamping member.

DONALD H. FINKLE.